Feb. 15, 1949.                A. THOMAS                2,461,579
                                TOOL
                          Filed Oct. 15, 1945

INVENTOR.
BY Albert Thomas
Marechal & Biehl
ATTORNEYS

Patented Feb. 15, 1949

2,461,579

UNITED STATES PATENT OFFICE 2,461,579

TOOL

Albert Thomas, Munhall, Pa.

Application October 15, 1945, Serial No. 622,309

1 Claim. (Cl. 279—6)

This invention relates to boring tools constructed for adjustment to provide a range of boring diameters with one composite tool member, and more particularly to such a composite tool construction in which extremely accurate variations of boring diameter may be readily attained.

One of the principal objects of the invention is to provide a precision boring tool construction which has simple and easily operated means for effecting accurate precision adjustment of the tool carrying member and for maintaining said adjustment for accurate precision work at a predetermined work setting.

Another object is to provide such a construction in which extremely accurate work positions may be readily attained by easily effected relative rotation of the two parts of the composite construction and those parts effectively locked and maintained in any selected positioning by means of mere axial movement of one part into another.

Another object of the invention is to provide a boring tool having cooperating tapered interfitting parts constructed for ready angular adjustment to effect extremely accurate relative lateral settings, said parts being also constructed for ready axial movement while in maintained lateral setting to effect strong locking engagement of said parts in work position.

Another object is to provide a boring tool in the form of a shank member and a tool member removably joined together for accurate lateral adjustment within a predetermined range by relative angular movement of a long tapered tool bearing part within a correspondingly tapered receiving socket in a tool holder and for simple and effective locking of the parts in undisturbed adjusted setting by simple axial movement only of the long tapered tool bearing part within its receiving socket.

Other objects and advantages will be apparent from the following description, the accompanying drawings and the appended claim.

In the drawing, in which like characters of reference designate like parts throughout, Fig. 1 is a side elevation, partly broken away, showing a composite tool construction embodying the invention;

Figures 1, 2, 3, 4:
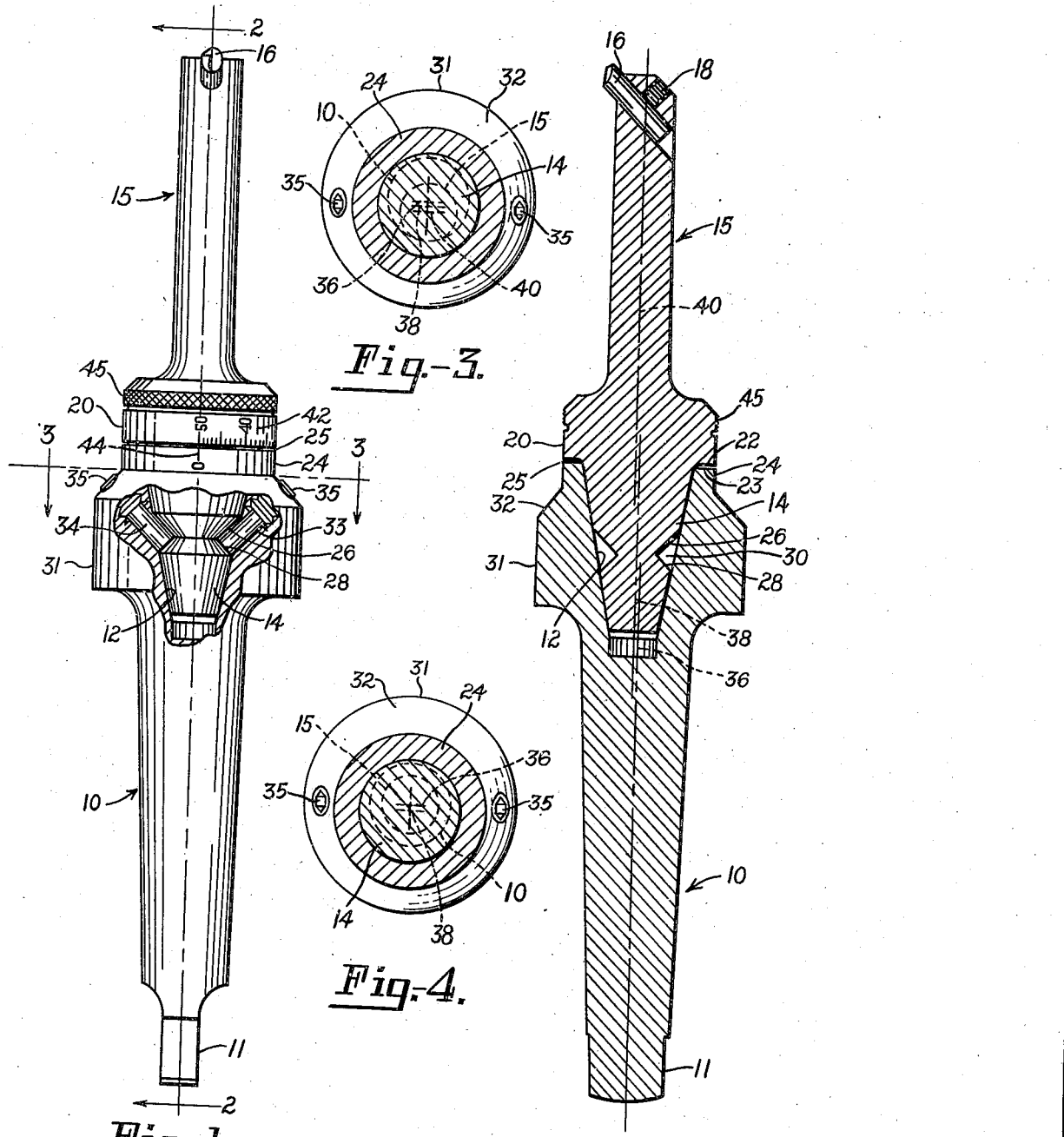
Fig. 2 is a section taken substantially on a vertical plane including the line 2—2 of Fig. 1 and perpendicular to the showing of Fig. 1, and showing the tool carrying member turned to the position of maximum lateral adjustment.
Fig. 3 is a section taken substantially on the line 3—3 of Fig. 1.
Fig. 4 is a section similar to Fig. 3 but showing the tool member rotated through 180° from the position shown in Fig. 3.

In the drawings, in which a preferred embodiment of the invention is shown, shank or tool receiving and holding member 10 has one end 11 formed for driving connection in a spindle or chuck device of a drill press, boring machine, or similar machine tool. At its opposite end shank member 10 is provided with a conical bore or receiving socket 12 which is of considerable axial length to provide a long bearing surface. A similar long tapered conical extension or insert boss portion 14 is formed at one end of the other main tool member 15. At its opposite end, tool member 15 is provided with a cutting element or bit 16 held in work or boring setting by means of one or more locking or set screws, one set screw 18 being illustrated as sufficient for a device of approximately the size shown. The base of boss portion 14 is of reduced diameter with respect to flange portion 20 of tool member 15, the flange portion thus extending outwardly beyond the extension 14, this portion 20 thus forming an enlargement which serves for effecting angular movement of the boss in the receiving socket 12. The face 22 of this enlargement is arranged generally transverse to the longitudinal axis of the tool carrying part 15 and said base or boss portion 14 is also somewhat larger in diameter than the maximum diameter of conical bore 12. The shoulder 22 will thus, at all times in adjustment and work setting of the device, be maintained in spaced relation with the adjacent and complementary end face 23 on portion 24 of shank member 10, this spacing being indicated by the numeral 25.

Bore 12 and boss 14 are substantially complementary and are machined so that they will be held in tight frictional engagement when in adjusted work setting. For extremely accurate precision work the cooperating surfaces of the receiving bore 12 and the extension 14 are accurately machined so that the parts will fit together throughout a long bearing contact with such snugness and close engagement that the longitudinal axes of the parts 10 and 15 are parallel, or substantially so, within the predetermined range of allowable tolerance in the accuracy of boring required; and, also, so that they are maintained in such engagement that they are held together with great rigidity. Boss 14 is cut away to provide walls 26 and 28 of an annular recess or groove 30 which is V shaped in cross-section and is spaced from the end and base of the boss. In Figs. 1 and 2 the cut out portions 26 and 28 are in the form of frustums of cones, and may be formed by simple machining operation so that their smaller ends come together at the apex of the V shaped groove and this construction may be readily and cheaply machined to desired accuracy for finest precision work by a simple turning operation, with the sides of the groove forming an angle of substantially 90°. As shown, shank member 10 is machined or formed to provide an enlarged portion 31, thus providing adequate strength in the zone of the receiving bore 12, with reduced weight. This enlarged portion is chamfered or beveled as at 32. This enlargement 31 carries a passage 33 arranged at an acute angle to the axis of shank 10 and receives a locking pin 34 one end of which bears against the face 28 and is adjustable toward and from such face. This pin is constructed so that it exerts a pressure on face 28 the resultant of which tends to move the part 14 axially in the bore 12 without any substantial or objectionable tendency towards annular movement or tilting which would disturb the selected relative angular positioning of parts 10 and 15. Two of these axial adjustment locking pins are shown, and the enlargement 32 is provided with two bores or passages for receiving the pins, the outer end of each passage being threaded and opening through the inclined or chamfered portion 32. The passages for receiving these pins are shown as having their axes lying in a plane which includes the longitudinal axis of the extension 14, and inclined at such an angle to said axis as to clear the face 32 and extend into the groove to rest against the face 28 so that when urged against said face 28 the resultant force effective upon the extension or insert portion 14 will be exerted to urge said extension 14 for straight line axial movement, coaxial with the longitudinal axis of the shank member 10 and bore 12, whereby any tendency toward effecting angular movement or tilting of the extension 14 within its receiving bore 12 is avoided, and the long bearing tapered cooperating surfaces of the extension 14 and member 12 are thus urged into accurate contacting relationship to provide a long bearing support for the two parts, in coaxial relationship. By means of this construction the two main parts of the composite tool may be so constructed that they may be readily and simply manufactured to effectuate and maintain extremely accurate adjustment without difficult and costly manufacturing operations and without the necessity of providing additional cooperating parts requiring great nicety and precision in the manufacturing of the several relatively cooperating parts, and without the necessity of providing different parts upon each main portion of the composite tool which must be formed with extreme relative precision for conjoint adjustment to secure variable work settings and which must be maintained jointly in extremely accurate relative adjusted position under working loads.

By arranging the pin receiving bores so that the axes of the pins will be substantially normal to the cooperating face 28 of boss 14, the mere axial adjustment of one main part of the composite tool with respect to the other without any material or objectionable tendency toward causing angular or tilting movement of the extension 14 with respect to the member 10 is avoided, and thus a very simple, cheaply manufactured, accurate and highly efficient and effective means is provided whereby upon backing off of the pins 34 the extension 14 may be readily moved angularly in its receiving bore 12, and by forcing the pins 34 inwardly to thus exert pressure contact upon the face 28 a simple axial movement results which locks the two main parts of the tool in the desired angularly adjusted position, and through the contacting long bearing surfaces provides a very rigid assembly which readily withstands working operations and maintains the tool within the predetermined allowable tolerance range in operation, such as a boring operation. The outer parts of the pins 34 are shown as threaded to engage in the threaded portion of the pin receiving passages and they are provided at their outer ends with means for receiving a tool to manipulate them, so that they may be screwed down to effect the desired tight fit between the surfaces of the extension 14 and of its receiving bore 12. As is shown clearly in Figs. 3 and 4 each of these pins is provided with an hexagonal recess 35, to receive the correspondingly shaped tool, as a convenient well known construction for effecting in or out movement of the pins.

While the bore 12 is axially parallel to the axis of the shank member 10, the axis of this bore is coincident with the axis of portion 24 of shank member 10 but eccentric with respect to the axis of the main portion of the shank member. This is shown particularly in Fig. 2 and in Figs. 3 and 4 in which the eccentricity is considerably exaggerated for purposes of clearer illustration. The axis of the shank member 10 is indicated at 36 and the axis of the bore 12 and shank portion 24 at 38. Likewise, boss portion 14 and flange portion 20 are concentric with respect to each other, and their axis is parallel to the main axis 40 of the tool member 15 but eccentric with respect thereto, and as this eccentric axis of these portions 14 and 20 in all angular settings coincides with the axis 38 of the bore 12, the dotted line 38 serves to indicate the positioning of both these eccentric axes. Because of this eccentricity of the axes of the bore 12 and the extension 14, each with respect to the main axes 36 and 40 respectively, angular adjustment of the extension 14 within the bore 12 will result in lateral adjustment of the main axis 40 with respect to the axis 36; and if the eccentricity of each is made equal, then by means of such angular adjustment the lateral setting of the tool carrying member 15 may be varied with respect to the main axis 36 by a variation ranging from zero to the maximum lateral adjustment which will be the sum of the eccentricities. In this way by simple angular adjustment through 180° arc, the lateral setting of the tool carrying member 15 may be varied within the predetermined range of adjustment, to provide a very simple, rugged and extremely accurate tool which may be utilized in lieu of a substantial number of different sized tools, the angular setting effecting extremely accurate variations in the working diameter of the tool carrying member for different diameter boring operation. The dimensions of the cooperating conical surfaces of the extension 14 and the receiving bore 12 are such that the cooperating surfaces thereof are brought into locking engagement before the face 22 engages into the opposing end of the part 24. As shown the end of the extension 14 terminates short of the bottom of the base so that the desired result may not be prevented.

Figs. 2 and 3 illustrate the device in the position of maximum eccentricity between tool member 15 and shank member 10, with axis 38 offset with respect to axis 36 and 40 similarly offset with respect to axis 38, although it should be understood that in the drawings the relative offset between said axis is exaggerated for purposes of illustration to an extent much greater than would customarily be employed. In this position, cutting element 16 on tool 15, for a given bit setting, will bore a hole of maximum diameter. If it is desired to reduce the size of the hole bored by cutter 16, it is merely necessary to release screws 34 and rotate boss 14 in bore 12. If the degree of eccentricity between the two sets of axes is the same, then when tool member 15 is rotated through 180° from the position shown in Figs. 2 and 3, it will be substantially concentric with shaft member 10 as indicated in Fig. 4. In other words, by rotating tool member 15 through 180° from the position shown in Fig. 4 to the position shown in Fig. 3, it is possible to increase the diameter of the hole bored by cutter 16 to an extent equal to the sum of the offset between axes 36 and 38 and the offset between axes 38 and 40. The scale means shown in Fig. 1 provides for accurately determining the adjustment or setting of the bit carrying part 15, and the diameter of the hole bored by the cutter 16. As shown such scale means 42 is carried by flange 20 on tool member 15 and adapted to register with a suitable index mark 44 adjacent end 24 of shank member 10. Furthermore, since the scale and basic index point are on portions 20 and 24 which are cylindrical, coaxial and of substantially the same diameter, and since they are separated by a relatively short distance, the relative setting of these parts may readily be accomplished as the adjusted scale may be easily read with great accuracy in all positions of adjustment. Since Fig. 1 shows the tool in the position of maximum eccentricity, the maximum value of scale 42 is shown in register with index mark 44, and the zero point of scale 42 will accordingly be positioned at 180° from said maximum value. The knurled portion 45 is formed integral with tool member 15 and facilitates easy manipulation to effect desired relative rotation between boss 14 and bore 12 to adjust the tool to predetermined setting. And since there will be no disturbing angularly effective, tilting or buckling forces as the axial locking motion is caused, this knurled portion may be readily maintained in precise adjusted position while the locking motion is effected.

The construction of this invention permits of attaining ready and extremely accurate adjustment, within the predetermined range, and of assuring that this adjustment will be undisturbed during locking and also maintained under working forces. And this is accomplished by the use of only two main tool parts and the simple and effective locking and position maintaining means. Thus this small number of component parts gives great accuracy and ease of adjustment with easily and simply manufactured parts, which parts do not require finishing to an extent necessarily comparable with the accuracy of the composite tool in use, but it is sufficient if the cooperating long bearing surfaces may be locked in positioning to insure strong frictional engagement therebetween for the maintained setting desired.

Very satisfactory results, for quite accurate adjustments and operations have been secured in practice with this construction where the tool member 15 is approximately $\frac{5}{16}$" in diameter and the shank and tool members are constructed with the eccentricity represented by each of the axes 36 and 40 equal to 0.00625", or a maximum eccentricity of 0.0125". With such eccentricity and with the scale registering from 0 to 50 over 180° as shown in Fig. 1, then the lateral displacement of the axes 36 and 40, during 180° of angular movement in such construction will range from 0 to 0.0125" and the lateral displacement will change by 0.0005" for each graduation on the scale. As shown, this permits the cutter element 16 to be varied to cut to diameters varying up to 0.0125" and with extremely fine lateral adjustments for easily observed angular movements of the scale. Furthermore, since as pointed out the relative angular setting of the tool and shank members either before or during tightening of the locking screws will not be subjected to disturbing angularly directed forces and since as shown the graduations of the scale are quite substantially separated from each other, even when measuring to so fine a unit as 0.0005", under normal usage the adjustment will be accurate to tolerances of a fraction of that amount.

The boring range of the tool may be varied also by adjustment of the cutter element with respect to the tool member 15. Its boring diameter, for the $\frac{5}{16}$" tool member referred to, may very satisfactorily range from approximately $\frac{3}{8}$" to $\frac{5}{8}$". For a fixed setting of the cutter element its lateral adjustment and the size of its boring diameter can be controlled very accurately by the relative rotation of the boss on the tool member in the complementary socket in the shank member, as described. Another size of tool found satisfactory for larger diameters uses a tool member diameter of approximately 1", and with such size for the member 15 the tool element may be satisfactorily adjusted for a boring range of approximately from $1\frac{1}{16}$" to 2", with the same accuracy of adjustment for each setting of the cutter element and without alteration or modification of the shank element. Other tool members of different diameters and lengths may be similarly utilized for other boring ranges and depths and similarly without modification of the shank member, which need only be of sufficient diameter over the major portion of its length to withstand the torque and bending forces applied thereto in use. The accuracy of lateral adjustment by the eccentricities may be made more or less than that resulting in the devices described using the above noted 0.00625", by varying the actual and relative eccentricities to increase or decrease the accuracy of adjustment and also the permissible amplitude of lateral adjustment.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

An adjustable boring bar comprising a shank member adapted at one end for attachment to a spindle and having at its other end a substantially conical, elongated bore axially offset with respect to but having its axis parallel with the axis of said shank member, and opposed symmetrically arranged, tapped bores intersecting said conical bore in a common annular plane; a tool supporting shank adapted at one end to receive a cutter bit and having at its other end a substantially conical, elongated boss axially offset with respect to but having its axis parallel with the axis of said tool supporting shank and coincident with the axis of said conical bore and provided with an annular V-shaped groove, said boss being adapted for mating assembly within said conical bore to dispose said V-shaped groove in coincident relation to the intersecting ends of said tapped bores; and pin means threadedly engaged in said tapped bores with their inner ends protruding into said annular V-shaped groove and adapted when loosened to secure said shank member and said tool supporting shank against axial dislocation while permitting relative rotational movement to effect adjustment of said cutter bit shank radially of said shank member to overcome objectionable eccentric rotation of the tool when in use and adapted when tightened to abut a wall of said V-shaped groove at symmetrically disposed points to force said tool supporting shank axially into tight frictional engagement with said conical bore to lock said shank member and said tool supporting shank together for unitary rotation.

ALBERT THOMAS

REFERENCES CITED

The following references are of record in the file of this patent:

UNITED STATES PATENTS

| Number | Name | Date |
|---|---|---|
| 1,774,050 | Brown | Aug. 26, 1930 |
| 1,174,309 | Clermont et al. | Mar. 7, 1916 |
| 1,958,817 | Gase | May 15, 1934 |
| 2,167,014 | Verderber | July 25, 1939 |

OTHER REFERENCES

Forray (Amer. Mach.) Nov. 1, 1917, vol. 14, No. 18, page 780. Copy is filed in Div. 52—279—6.